United States Patent [19]

Scott

[11] Patent Number: 5,388,463

[45] Date of Patent: Feb. 14, 1995

[54] LOAD INDICATING

[75] Inventor: Philip M. Scott, Dudley, England

[73] Assignee: Rotabolt Limited, United Kingdom

[21] Appl. No.: 78,265

[22] PCT Filed: Jan. 14, 1992

[86] PCT No.: PCT/GB92/00072

§ 371 Date: Jun. 28, 1993

§ 102(e) Date: Jun. 28, 1993

[87] PCT Pub. No.: WO92/13203

PCT Pub. Date: Aug. 6, 1992

[30] Foreign Application Priority Data

Jan. 16, 1991 [GB] United Kingdom ............... 9100890

[51] Int. Cl.$^6$ .......................... G01L 1/14; F16B 31/02
[52] U.S. Cl. ...................................... 73/761
[58] Field of Search .................. 73/761, 862.21, 779, 73/862.626; 331/65; 340/870.32

[56] References Cited

U.S. PATENT DOCUMENTS

Re. 30,183   1/1980   Popenoe ..................... 73/761

Primary Examiner—Tom Noland
Assistant Examiner—Eric S. McCall
Attorney, Agent, or Firm—Kirschstein et al.

[57] ABSTRACT

A hollow bolt (10) contains first and second electrical contact elements (13, 16) which are moved apart when the bolt is subjected to a predetermined tensile lead. A carrier (14) for a first of the contact elements contains an inductor (18) connected electrically between the contact elements, the condition of the contact elements is ascertained by inductive coupling of test apparatus with the inductor.

4 Claims, 1 Drawing Sheet

LOAD INDICATING

BACKGROUND OF THE INVENTION

1. Field of the Invention

The present invention relates to the indication of a load to which a member is subjected. The invention has been devised primarily for use in fasteners or other members which are to be subjected to a predetermined load and the invention is useful during initial loading of the member and subsequently for checking that the required lead has been maintained.

2. Description of the Related Art

In GB 2212284 A., there is disclosed a hollow bolt containing first and second carriers, each carrying a respective electrically conductive element. When the bolt is subjected to a first load, these elements are in mutual contact. When the bolt is subjected to a second load, the conductive elements are out of mutual contact. This change in the condition of the device is detected electrically. To facilitate this, the first electrical contact extends through the first carrier to a face thereof exposed at an end of tile bolt. The second carrier provides an electrically conductive path between the second element and the bolt. To ascertain whether the elements are in mutual contact, electrically conductive probes are applied to an end of the bolt and an exposed end of the first element, these probes being connected in an electrical circuit which includes a source of electrical power and a lamp or other signalling device.

SUMMARY OF THE INVENTION

It is an object of the invention to provide a more reliable indication of load than can be achieved by the known arrangement under certain conditions.

According to the present invention, there is provided a device comprising a hollow member, an inductor and first and second electrically conductive elements which are anchored to or freed with respect to respective portions of the member, which portions undergo relative movement when the member is stressed, wherein, when the member is subjected to a first load, the elements are in mutual electrically conductive contact at a position inside the hollow member and, when the member is subjected to a second load, the elements are out of mutual electrically conductive contact and wherein the inductor is connected electrically between said elements so that a closed circuit including the inductor exists when the elements are in mutual contact.

The presence or absence of the closed circuit can be checked, using inductive coupling between testing apparatus and the inductor of the device embodying the invention. It is therefore unnecessary to establish an electrically conductive relation between test apparatus and the device.

BRIEF DESCRIPTION OF THE DRAWINGS

An example of a fastener embodying fie present invention will now be described, with reference to the accompanying drawing, which shows the fastener partly in cross section.

DETAILED DESCRIPTION OF THE PREFERRED EMBODIMENT

Figure 1:
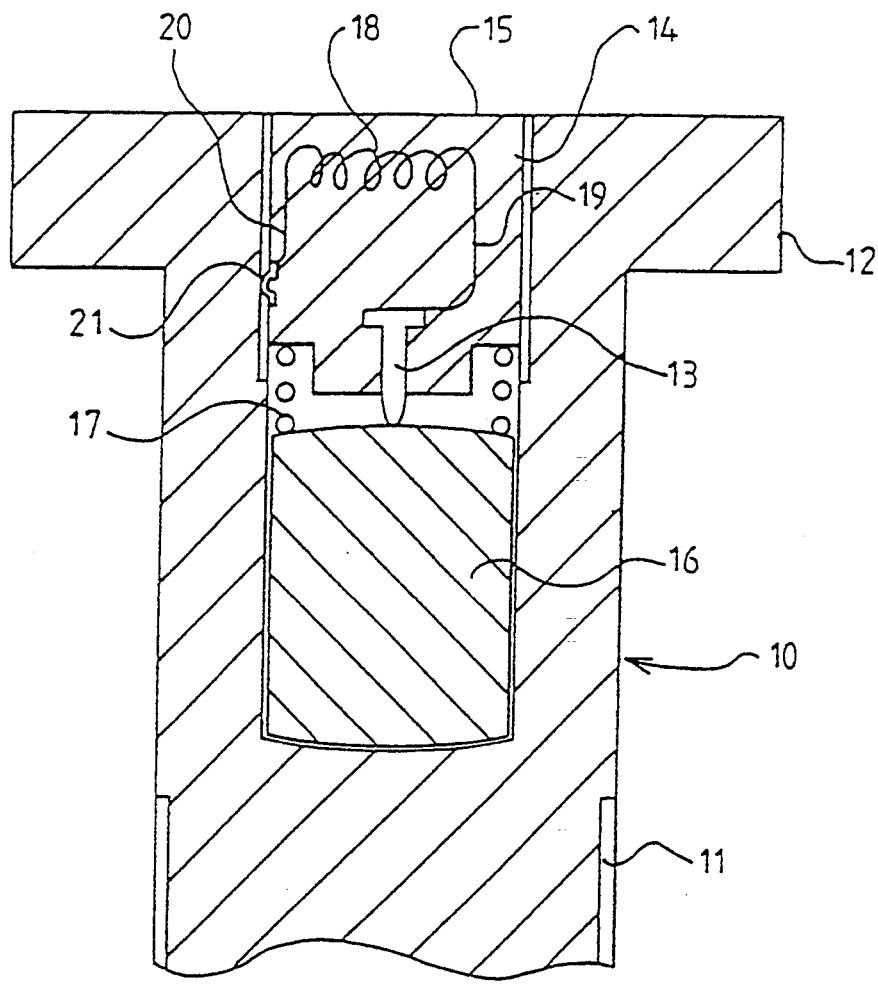

The particular fastener illustrated in the accompanying drawing is a bolt 10 having a male screw thread 11 and a head 12. The bolt is hollow. In the particular example illustrated, a blind bore extends into the bolt from an end face thereof presented by fie head 12. The bore is preferably coaxial with the thread 11 and extends substantially beyond the head 12.

There is disposed inside the bolt a first electrically conductive element 13 carried by a carrier 14. The carrier also is disposed at least partly inside the bolt. However, at least one face 15 of the carrier is exposed at the outside of the bolt. The carrier 14 is fixed with respect to the bolt 10. In the example illustrated, the carrier and fie bolt have respective cooperating screw threads and fie carrier is restrained against turning relative to the bolt, for example by means of an adhesive on the threads. Also in the example illustrated, the electrically conductive element 13 is fled with respect to the carrier 14.

A second electrically conductive element 16 is also disposed inside the bolt. This element occupies an inner portion of the bore formed in fie bolt and is urged by a spring 17 onto a seat at the blind end of the bore. The spring 17 acts between the element 16 and the carrier 14. The element 16 is resiliently compressible and may comprise a plastics composition loaded with an electrically conductive material. The bolt 10 is formed of an electrically conductive material and the element 16 is in electrically conductive relation with the bolt.

The carrier 14 is formed of an electrically insulating material, conveniently a plastics material There is encapsulated in the carrier an inductor 18. The inductor is connected electrically between the element 13 and the element 16. In the example illustrated, the inductor is a coil having one end connected by a lead 19 with the element 13 and opposite end of the coil is connected by a lead 20 with a metal sleeve 2 on the outside of the carrier 14. A part of the screw thread of the carder may be formed on this sleeve. The sleeve is in electrical contact with the bolt 10, which provides an electrically conductive path to the element 16.

The device is prepared for use by placing the element 16 in the bore of the bolt, then placing the spring 17 in the bore and then screwing the carrier 14 into the bore until the element 13 just contacts the element 16. This condition may be detected electrically. The carrier is then screwed a further, predetermined distance into the bore. This further movement of the carrier and element 13 is accommodated by compression of the element 16. The carrier is then fixed in the position to which it has been set. This may be achieved by curing of an adhesive on the internal thread of the bolt. Other ways of fixing the carrier 14 wig respect to the bolt may be employed. For example, the carrier may be a force-fit inside the bolt:

When the bolt is in use and is subjected to tension, the shank of the bolt stretches and the carrier 14 moves away from the seat at the blind end of the bore. When the bolt has been subjected to the required load, the element 14 moves out of electrical contact with the element 16. This is detected electrically.

For detecting whether the elements 13 and 16 are in electrical contact with each other, there is used a test apparatus (not shown) which is capable of inductive coupling with the inductor 18 of the circuit in the bolt. The test apparatus may be arranged to provide an indication of whether there is a closed circuit containing the inductor 18 in the bolt. Additionally, the test apparatus may be arranged to provide an indication which vanes in a manner dependent upon the capacitance between the elements 13 and 16. It will be appreciated that this capacitance will change as the separation between these elements changes.

The bolt 10 may be used in place of bolts disclosed in GB 2212284A. Furthermore, the device illustrated in the accompanying drawing may be modified by the incorporation of features disclosed in fie aforesaid specification. For example, there may be substituted for the element 16 a second carrier carrying an electrically conductive element and containing a spring which acts between the second carrier and the second conductive element.

The inductor 18 lies close to the face 15 of the carrier 14 so that an inductor of test apparatus can be brought into close proximity with the inductor 18.

The carrier 14 preferably closes the bore of the bolt to prevent ingress of moisture and of air.

The features disclosed in the foregoing description, or the following claims, or the accompanying drawings, expressed in their specific forms or in terms of a means for performing the disclosed function, or a method or process for attaining the disclosed result, as appropriate, may, separately or in any combination of such features, be utilised for realising the invention in diverse forms thereof.

I claim:

1. A device comprising a hollow member and first and second electrically conductive elements which are anchored to or Fixed with respect to respective portions of the hollow member, which portions undergo relative movement when the hollow member is stressed, wherein, when the hollow member is subjected to a first load, the elements are in mutual electrical contact at a position inside the hollow member and, when the hollow member is subjected to a second load, the elements are out of mutual electrically conductive contact, characterised in that there is provided an inductor connected electrically between said elements so that a closed electrical circuit including the inductor exists when the elements are in mutual contact.

2. A device according to claim 1 Further comprising a carrier For the inductor, which carrier lies at least partly inside the hollow member.

3. A device according to claim 2 wherein the carrier also carries the first electrically conductive element.

4. A device according to claim 2 wherein the inductor is inside the carrier and is adjacent to a surface thereof which is exposed outside the hollow member.

* * * * *